United States Patent
Ito et al.

(10) Patent No.: US 10,525,914 B2
(45) Date of Patent: Jan. 7, 2020

(54) POWER SYSTEM

(71) Applicant: HONDA MOTOR CO., LTD., Tokyo (JP)

(72) Inventors: Yoshihiro Ito, Wako (JP); Yasuyuki Sando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 15/712,143

(22) Filed: Sep. 22, 2017

(65) Prior Publication Data

US 2018/0086294 A1    Mar. 29, 2018

(30) Foreign Application Priority Data

Sep. 27, 2016 (JP) ................... 2016-188915

(51) Int. Cl.
*B60R 16/02* (2006.01)
*B60W 10/08* (2006.01)
(Continued)

(52) U.S. Cl.
CPC .......... *B60R 16/033* (2013.01); *B60R 16/023* (2013.01); *B60W 10/06* (2013.01);
(Continued)

(58) Field of Classification Search
CPC ..... B60R 16/033; B60R 16/023; F01K 23/14; F02B 67/04; F02B 67/06; H02J 7/14;
(Continued)

(56) References Cited

U.S. PATENT DOCUMENTS

2014/0277873 A1* 9/2014 Hartl ............... B60W 30/08
  701/22
2014/0350764 A1* 11/2014 Arai ............... B60W 40/10
  701/22
(Continued)

FOREIGN PATENT DOCUMENTS

JP      2004-108167      4/2004
JP      4958126 B2       6/2012
(Continued)

OTHER PUBLICATIONS

Japanese Office Action for corresponding JP Application No. 2016-188915, dated Mar. 6, 2018.

*Primary Examiner* — Jacob M Amick
(74) *Attorney, Agent, or Firm* — Mori & Ward, LLP

(57) ABSTRACT

A power system includes: an internal combustion engine; a motor to perform power running; a generator to perform power generating operation and the power running; a power transmission mechanism via which the internal combustion engine, the motor, and the generator are connected to drive a driven load by at least one of the internal combustion engine, the motor, and the generator and to perform power transmission between the internal combustion engine and the generator; and a processor configured to perform a first control process to control the motor to perform the power running so that the driven load is driven only by the motor and to perform a second control process to control both the motor and the generator to perform the power running so that the driven load is driven by both of the motor and the generator.

14 Claims, 5 Drawing Sheets

(51) Int. Cl.
*B60W 20/00* (2016.01)
*B60R 16/033* (2006.01)
*B60W 10/06* (2006.01)
*B60W 20/10* (2016.01)
*B60R 16/023* (2006.01)
*F01K 23/14* (2006.01)
*F01N 5/02* (2006.01)
*F02B 67/04* (2006.01)
*H02J 7/14* (2006.01)

(52) U.S. Cl.
CPC ............ *B60W 10/08* (2013.01); *B60W 20/10* (2013.01); *F01K 23/14* (2013.01); *F01N 5/02* (2013.01); *F02B 67/04* (2013.01); *H02J 7/14* (2013.01); *B60W 2510/0676* (2013.01); *B60W 2510/087* (2013.01); *Y02T 10/6286* (2013.01); *Y02T 10/7258* (2013.01)

(58) Field of Classification Search
CPC ...... B60W 10/08; B60W 10/06; B60W 20/00; B60W 20/10; B60W 20/13; B60W 20/40
See application file for complete search history.

(56) References Cited

U.S. PATENT DOCUMENTS

2015/0291175 A1* 10/2015 Harada .................. B60K 6/445
701/22
2016/0137192 A1* 5/2016 Wu ........................ B60W 20/50
701/22
2016/0272195 A1* 9/2016 Hirasawa .............. B60W 20/50

FOREIGN PATENT DOCUMENTS

| JP | 5842486 B2 | 3/2013 |
| JP | 2013-184651 | 9/2013 |
| JP | 2015-182550 | 10/2015 |
| WO | WO 2013/140537 | 9/2013 |

\* cited by examiner

POWER SYSTEM

CROSS-REFERENCE TO RELATED APPLICATIONS

The present application claims priority under 35 U.S.C. § 119 to Japanese Patent Application No. 2016-188915, filed Sep. 27, 2016, entitled "Power System." The contents of this application are incorporated herein by reference in their entirety.

BACKGROUND

1. Field

The present disclosure relates to a power system

2. Description of the Related Art

For example, hybrid vehicles having power systems mounted therein, such as the one described in Japanese Patent No. 4958126, are known. The power systems each include an internal combustion engine, a motor, and a generator. In such a hybrid vehicle, series hybrid drive or parallel hybrid drive is performed. In the series hybrid drive, a vehicle is driven with power of the motor while power generating operation of the generator is being performed using power of the internal combustion engine. In the parallel hybrid drive, a vehicle is driven with power resulting from combination of power of the internal combustion engine and power of the motor.

In addition, for example, hybrid vehicles having power systems mounted therein, such as the one described in Japanese Patent No. 5842486, are also known. An internal combustion engine, a first motor-generator, a second motor-generator, and a planetary gear device are combined with each other in such a power system.

SUMMARY

According to one aspect of the present invention, a power system includes an internal combustion engine; a motor, a generator, a power transmission mechanism, and a control apparatus. The motor is capable of performing power running. The generator is capable of performing power generating operation and the power running. Output shafts of the internal combustion engine, the motor, and the generator are connected to the power transmission mechanism. The power transmission mechanism is capable of transmitting powers of three power generation sources including the internal combustion engine, the motor, and the generator to a driven load regardless of whether power is generated by another power generation source and is capable of performing power transmission between the internal combustion engine and the generator. The control apparatus controls operations of the internal combustion engine, the motor, and the generator. The control apparatus has functions to perform a first control process to cause the motor to perform the power running so that only the power of the motor is transmitted to the driven load and to perform a second control process to cause both the motor and the generator to perform the power running so that the powers of both the motor and the generator are transmitted to the driven load.

According to another aspect of the present invention, a power system includes: an internal combustion engine; a motor to perform power running; a generator to perform power generating operation and the power running; a power transmission mechanism via which the internal combustion engine, the motor, and the generator are connected to drive a driven load by at least one of the internal combustion engine, the motor, and the generator and to perform power transmission between the internal combustion engine and the generator; and a processor configured to perform a first control process to control the motor to perform the power running so that the driven load is driven only by the motor and to perform a second control process to control both the motor and the generator to perform the power running so that the driven load is driven by both of the motor and the generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
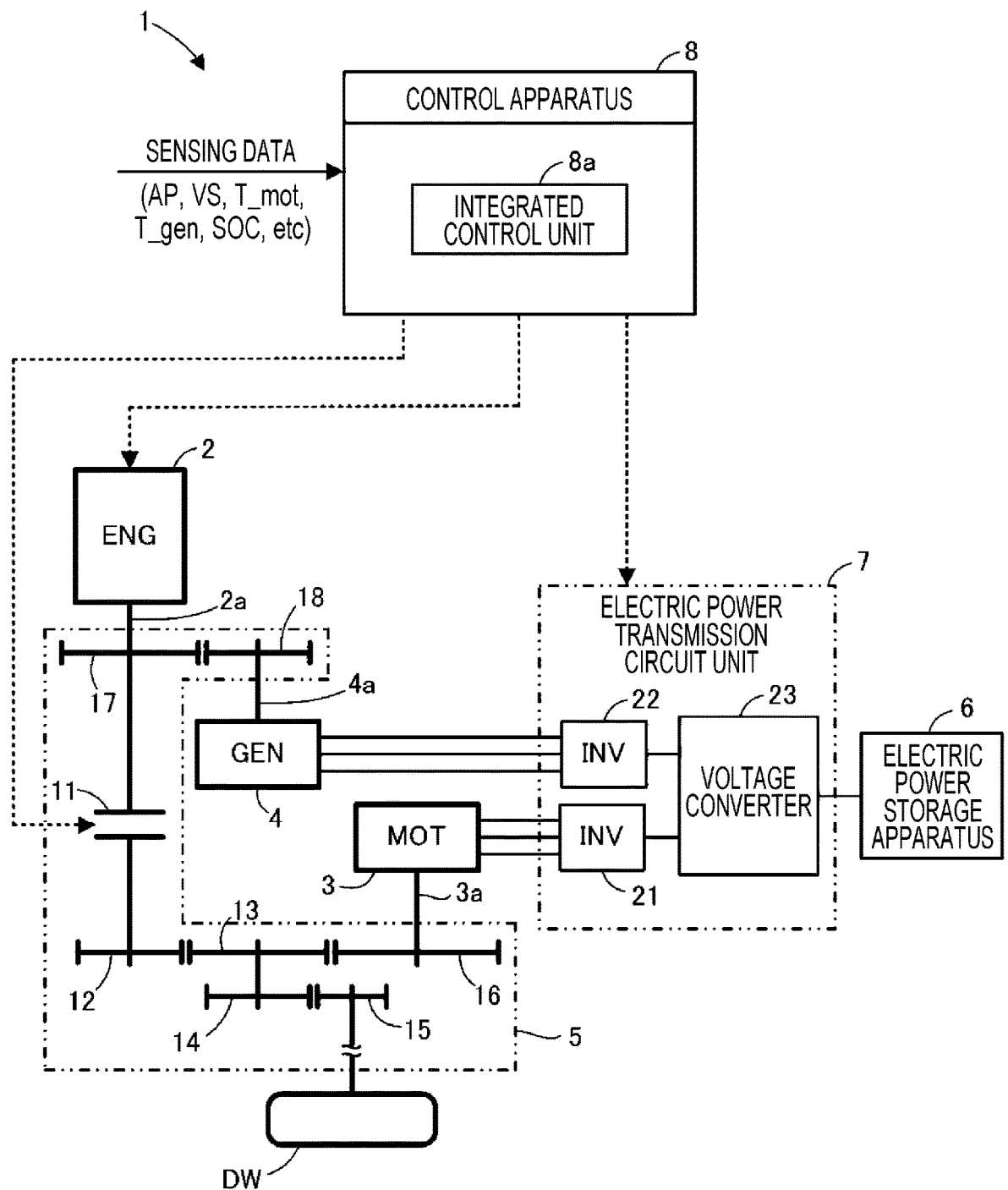
FIG. 1 illustrates the entire configuration of a power system according to an embodiment of the present disclosure.

The embodiments will now be described with reference to the accompanying drawings, wherein like reference numerals designate corresponding or identical elements throughout the various drawings.

An embodiment of the present disclosure will herein be described with reference to FIG. 1 to FIG. 7. FIG. 1 illustrates a power system 1 according to the present embodiment mounted in a vehicle (specifically, a hybrid vehicle), which is an example of a transportation machine.

Referring to FIG. 1, the power system 1 includes an internal combustion engine 2, a motor 3, a generator 4, a power transmission mechanism 5, an electric power storage apparatus 6, an electric power transmission circuit unit 7, and a control apparatus 8. Each of the internal combustion engine 2, the motor 3, and the generator 4 is capable of generating power with which a driving wheel DW, which is a driven load, is rotationally driven. An output shaft 2a of the internal combustion engine 2, an output shaft 3a of the motor 3, and an output shaft 4a of the generator 4 are connected to the power transmission mechanism 5. The electric power storage apparatus 6 servers as a power supply for the motor 3. The electric power transmission circuit unit 7 is used to transmit electric power among the motor 3, the generator 4, and the electric power storage apparatus 6. The control apparatus 8 has a function to control the operation of the power system 1.

The internal combustion engine 2 (hereinafter referred to as an engine 2) includes a single or multiple cylinders (not illustrated) and generates power (rotational driving force) at the output shaft 2a of the engine 2 by burning fuel in the single or multiple cylinders. The power generated by the engine 2 is used for driving of the driving wheel DW or driving of the generator 4.

The motor 3 generates power (rotational driving force) at the output shaft 3a of the motor 3 through power running in which supply of electric power is received. The power generated by the motor 3 is used for driving of the driving wheel DW. The motor 3 is capable of performing regeneration operation in which regenerative power is output in a state in which the output shaft 3a of the motor 3 is rotationally driven with kinetic energy of the vehicle, which is transmitted from the driving wheel DW side.

The generator 4 performs power generating operation by rotationally driving the output shaft 4a of the generator 4 with the power of the engine 2. The generated power output from the generator 4 through the power generating operation is used as charge power for the electric power storage apparatus 6 or the power for the power running of the motor 3.

The generator 4 is capable of performing the power running in which supply of electric power is received. During the power running, the generator 4 generates power (rotational driving force) at the output shaft 4a. The power generated by the generator 4 is used for driving of the driving wheel DW or rotational driving (cranking) of the output shaft 2a when the engine 2 is started.

In the present embodiment, the generator 4 has specifications in which the maximum power (power converted into electric power) capable of being output in the power running of the generator 4 is lower than those of the engine 2 and the motor 3. Accordingly, the generator 4 is relatively small in size.

The power transmission mechanism 5 is configured so that the powers input from the output shaft 2a of the engine 2, the output shaft 3a of the motor 3, and the output shaft 4a of the generator 4 are capable of being transmitted to the driving wheel DW and so that power transmission between the engine 2 and the generator 4 is enabled.

In the present embodiment, the power transmission mechanism 5 is capable of transmitting the power of the engine 2 from the output shaft 2a to the driving wheel DW using a power transmission mechanism including a clutch 11 and multiple gears 12, 13, 14, and 15. The clutch 11 is capable of selectively operating in a connection state in which the power transmission is enabled and a disconnection state in which the power transmission is disabled.

The clutch 11 is coupled to the output shaft 2a of the engine 2. Among the multiple gears 12, 13, 14, and 15, the gear 12 is coupled to the output shaft 2a via the clutch 11 so as to rotate integrally with the output shaft 2a of the engine 2 in the connection state of the clutch 11. The gears 13 and 14 are coaxially coupled to each other so as to rotate integrally with each other. In the gears 13 and 14, the gear 13 is meshed with the gear 12 and the gear 14 is meshed with the gear 15 capable of rotating in conjunction with the driving wheel DW.

The gear 15 is connected to multiple driving wheels DWs via a differential gear unit (not illustrated) so that the power transmitted from the gear 14 side is capable of being distributed to the multiple driving wheels DWs. Only one driving wheel DW is representatively illustrated in FIG. 1.

Accordingly, in the connection state of the clutch 11, the power of the engine 2 is capable of being transmitted from the output shaft 2a to the driving wheel DW sequentially via the clutch 11 and the gears 12, 13, 14, and 15.

In addition, the power transmission mechanism 5 is capable of transmitting the power of the motor 3 from the output shaft 3a to the driving wheel DW using a power transmission mechanism including the gears 13, 14, and 15, which are part of the components in the power transmission mechanism from the engine 2 to the driving wheel DW (the components at the driving wheel DW side with respect to the clutch 11), and a gear 16.

In this case, the gear 16 is coaxially coupled to the output shaft 3a so as to rotate integrally with the output shaft 3a of the motor 3 and is meshed with the gear 13.

Accordingly, the power of the motor 3 is capable of being transmitted from the output shaft 3a to the driving wheel DW sequentially via the gears 16, 13, 14, and 15.

The gear 16 may be meshed with another gear (for example, the gear 12 or the gear 14) provided on the power transmission path from the clutch 11 to the gear 15.

The power transmission mechanism 5 is configured so as to perform the power transmission between the engine 2 and the generator 4 using a power transmission mechanism including gears 17 and 18 and is configured so as to transmit the power of the generator 4 from the output shaft 4a to the driving wheel DW via the gears 17 and 18 and the power transmission mechanism from the engine 2 to the driving wheel DW.

In this case, in the gears 17 and 18, the gear 17 is coaxially coupled to the output shaft 2a between the clutch 11 and the engine 2 so as to rotate integrally with the output shaft 2a of the engine 2. The gear 18 is coaxially coupled to the output shaft 4a so as to rotate integrally with the output shaft 4a of the generator 4 and is meshed with the gear 17.

Accordingly, the power transmission between the engine 2 and the generator 4 is enabled via the gears 17 and 18 regardless of the operation state of the clutch 11 (regardless of whether the clutch 11 is in the connection state or the disconnection state). The output shaft 2a of the engine 2 and the output shaft 4a of the generator 4 rotate in conjunction with each other.

In the connection state of the clutch 11, the power of the generator 4 is capable of being transmitted from the output shaft 4a to the driving wheel DW sequentially via the gears 18 and 17, the clutch 11, and the gears 12, 13, 14, and 15.

Since the power transmission mechanism 5 is configured in the above manner in the present embodiment, the powers of the three power generation sources: the engine 2, the motor 3, and the generator 4 are capable of being transmitted to the driving wheel DW regardless of whether power is generated by another power generation source.

In other words, the power is capable of being transmitted to the driving wheel DW in a state in which only one arbitrary power generation source, among the three power generation sources: the engine 2, the motor 3, and the generator 4, is caused to generate power. In a state in which two or more power generation sources, among the three power generation sources, are caused to generate power, the combined power is capable of being transmitted to the driving wheel DW.

The power transmission from the engine 2 or the generator 4 to the driving wheel DW is performed in the connection state of the clutch 11.

The power transmission mechanism capable of transmitting the powers of the engine 2, the motor 3, and the generator 4 to the driving wheel DW in the above manner is not limited to the power transmission mechanism 5 illustrated in FIG. 1.

For example, a power transmission component other than the gears (for example, a pulley and a belt or a sprocket wheel and a chain) may be included on the power transmission path between any of the power generation sources: the engine 2, the motor 3, and the generator 4 and the driving wheel DW. In addition, a speed change gear may be included on the power transmission path.

The output shaft 3a of the motor 3 may be coaxially and directly coupled to, for example, any rotary shaft (for example, the rotary shaft of the gear 12 or the rotary shaft of the gear 13 or 14) in the power transmission mechanism between the clutch 11 and the driving wheel DW or may be configured integrally with any rotary shaft.

The power transmission mechanism between the motor 3 and the driving wheel DW or the power transmission mechanism between the engine 2 and the generator 4 may include a clutch.

The electric power storage apparatus 6 is capable of being charged from an external power source via a charging device (not illustrated) provided in the vehicle. The electric power storage apparatus 6 is composed of, for example, a lithium ion battery, a nickel hydride battery, or a capacitor.

The electric power transmission circuit unit 7 includes an inverter 21 connected to the motor 3, an inverter 22 connected to the generator 4, and a voltage converter 23 connected to the electric power storage apparatus 6 in the present embodiment.

Each of the inverters 21 and 22 is a known circuit that controls a switching element provided in each of the inverters 21 and 22 using a duty signal to perform power conversion from one of direct-current (DC) power and alternating-current (AC) power to the other thereof.

The inverter 21 at the motor 3 side performs control in which the DC power supplied from the voltage converter 23 side is converted into the AC power and the AC power is supplied to the motor 3 during the power running of the motor 3. The inverter 21 at the motor 3 side performs control in which the AC power (regenerative power) supplied from the motor 3 is converted into the DC power and the DC power is supplied to the voltage converter 23 side during the regeneration operation of the motor 3.

The inverter 22 at the generator 4 side performs control in which the AC power (the generated power) supplied from the generator 4 is converted into the DC power and the DC power is supplied to the voltage converter 23 side during the power generating operation of the generator 4. The inverter 22 at the generator 4 side performs control in which the DC power supplied from the voltage converter 23 side is converted into the AC power and the AC power is supplied to the generator 4 during the power running of the generator 4.

The voltage converter 23 is a known circuit (a switching DC-DC converter) which controls a switching element provided in the voltage converter 23 using a duty signal to perform power conversion of the DC power. The voltage converter 23 is capable of variably controlling the conversion ratio of voltage and is capable of performing bidirectional power transmission between the electric power storage apparatus 6 side and the inverters 21 and 22 side.

The control apparatus 8 is composed of an electronic circuit unit including a central processing unit (CPU), a random access memory (RAM), a read only memory (ROM), an interface circuit, and so on. The control apparatus 8 may be composed of multiple electronic circuit units capable of communicating with each other.

The control apparatus 8 includes an integrated control unit 8a that selectively determines an operation mode of the power system 1 from multiple kinds of operation modes and that determines operation instructions used to set the operation states of the engine 2, the motor 3, the generator 4, and the clutch 11 in each operation mode, as a function realized by hardware components that are implemented or programs (software components) that are implemented.

The control apparatus 8 controls the engine 2, the motor 3, the generator 4, and the clutch 11 in accordance with the determined operation instructions. In this case, the control of the operation of the engine 2 is performed using a fuel supply apparatus, a throttle valve, an actuator, and so on (not illustrated) and the control of switching of the operation state of the clutch 11 is performed using an actuator (not illustrated). The control of the operation of the motor 3 and the generator 4 is performed using the inverters 21 and 22 and the voltage converter 23.

In the present embodiment, the operation modes of the power system 1 is roughly classified into a charge depleting (CD) mode and a charge sustaining (CS) mode.

In the CD mode, the motor 3 is used as a main power generation source for driving of the driving wheel DW and the storage power in the electric power storage apparatus 6 is consumed (the state of charge in the electric power storage apparatus 6 is reduced) by supplying the electric power from the electric power storage apparatus 6 to the motor 3.

The CD mode is further classified into an operation mode in which only the power of the motor 3 is used to drive the driving wheel DW (hereinafter referred to as a first CD mode), an operation mode in which the power of the generator 4 is additionally used, in addition to the power of the motor 3, to drive the driving wheel DW (hereinafter referred to as a second CD mode), and an operation mode in which the powers of the engine 2 and the generator 4 are additionally used, in addition to the power of the motor 3, to drive the driving wheel DW (hereinafter referred to as a third CD mode).

The second CD mode and the third CD mode are used when the motive force required in accordance with, for example, the accelerator operation amount of the vehicle (the required driving force of the entire driving wheel DW) is large and it is difficult to realize the motive force only with the power of the motor 3 in the CD mode. The normal operation mode in the CD mode is the first CD mode.

In the present embodiment, among the first CD mode, the second CD mode, and the third CD mode, a control process in the first CD mode corresponds to a first control process of the present disclosure and control processes in the second CD mode and the third CD mode correspond to a second control process of the present disclosure.

The first CD mode may be an operation mode in which the engine 2 is kept at the shutdown state. However, the first CD mode may be an operation mode in which the operation of the engine 2 and the power generating operation of the generator 4 with the power of the engine 2 are appropriately performed, for example, when the state of charge in the electric power storage apparatus 6 is decreased to some extent and the generated power in the generator 4 is capable of being supplied to the motor 3 along with the storage power in the electric power storage apparatus 6. In other words, the first CD mode may be an operation mode in which the vehicle is capable of being appropriately driven as a series hybrid vehicle.

The operation mode in which the power of a power generation source other than the motor 3 is additionally used in the CD mode may be only one of the second CD mode and the third CD mode. For example, when discharge of exhaust from the engine 2 in the CD mode is inhibited due to legal restraints or the likes or when reduction in the amount of discharge of the exhaust from the engine 2 is required, only the second CD mode may be used as the operation mode in which the power of a power generation source other than the motor 3 is additionally used.

In the CS mode, the engine 2 is used as a main power generation source for driving of the driving wheel DW to drive the driving wheel DW so as to suppress the reduction in the state of charge in the electric power storage apparatus 6. The CS mode includes an operation mode in which the power of the motor 3 is additionally used, in addition to the power of the engine 2, to drive the driving wheel DW (in other words, an operation mode in which the vehicle is driven as a parallel hybrid vehicle), in addition to the operation mode in which only the power of the engine 2 is used to drive the driving wheel DW.

A variety of sensing data is input into the control apparatus 8 as information necessary to perform these control processes in the CD mode and the CS mode. In the present embodiment, the sensing data includes data indicating the detected values of, for example, the amount of operation AP of an accelerator pedal of the vehicle (hereinafter referred to as an accelerator operation amount AP), a vehicle speed VS, a temperature $T\_mot$ of the motor 3, a temperature $T\_gen$ of the generator 4, and a state of charge SOC in the electric power storage apparatus 6.

The control apparatus 8 may have a function as a detector that detects (estimates) the state of charge SOC in the electric power storage apparatus 6. In this case, sensing data for estimating the state of charge SOC (for example, data indicating the detected values of the voltage, the current, the temperature, and so on of the electric power storage apparatus 6) is input into the control apparatus 8, instead of the sensing data indicating the detected value of the state of charge SOC.

The control processes by the control apparatus 8 will now be specifically described.

Figure 7:
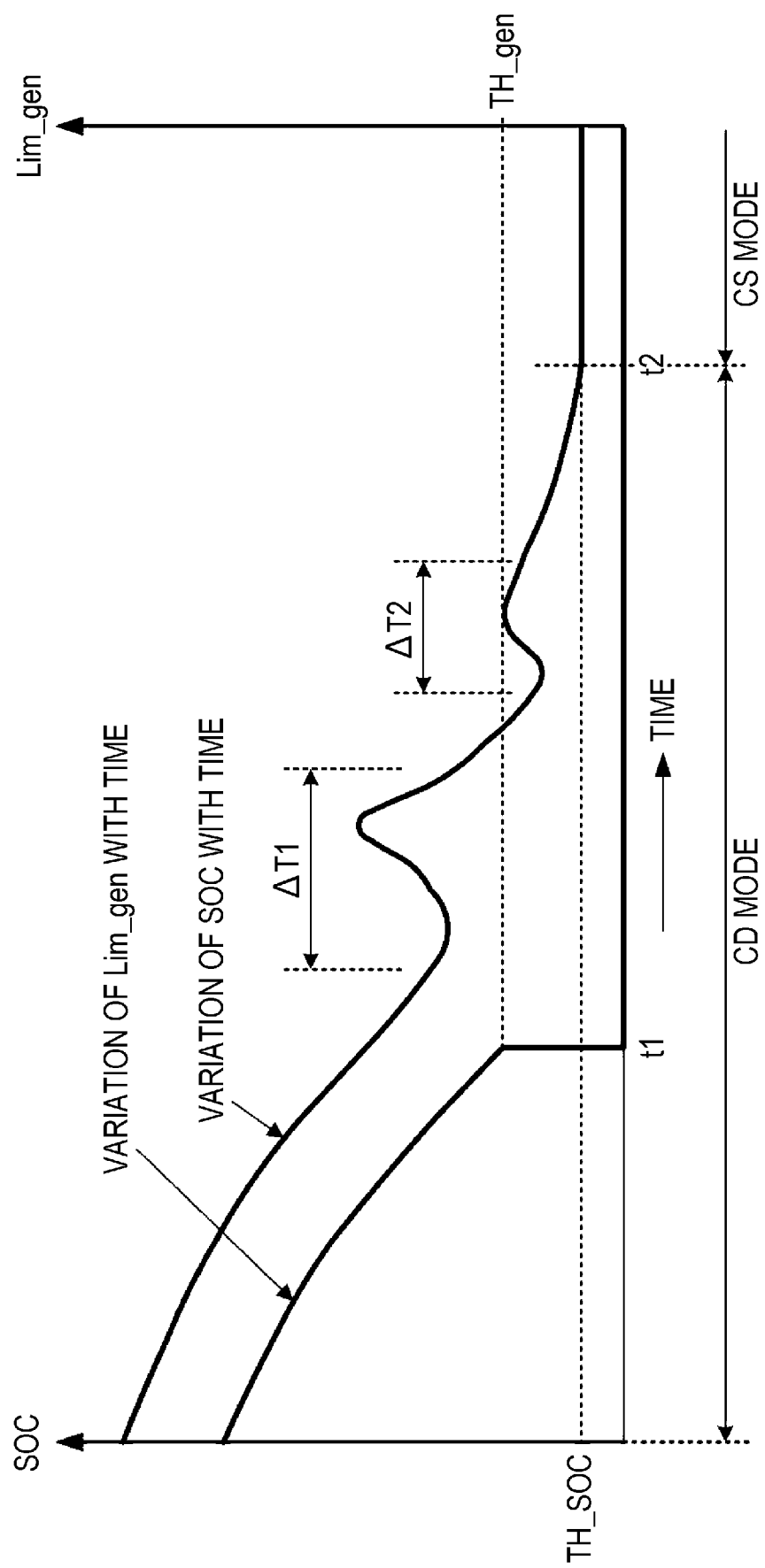
FIG. 7 is a graph illustrating an example of how an state of charge in an electric power storage apparatus and an upper-limit output of the generator are varied with time.

The integrated control unit 8a in the control apparatus 8 selects the operation mode (the CD mode or the CS mode) of the power system 1 in accordance with the detected value of the state of charge SOC in the electric power storage apparatus 6. For example, as illustrated in FIG. 7, the integrated control unit 8a in the control apparatus 8 sets the operation mode of the power system 1 to the CD mode in a state in which the detected value of the state of charge SOC in the electric power storage apparatus 6 is higher than a predetermined threshold value TH_SOC (in a state before a time t2 in FIG. 7) and switches the operation mode of the power system 1 from the CD mode to the CS mode in a state in which the detected value of the state of charge SOC is decreased to a value smaller than or equal to the threshold value TH_SOC (a state after the time t2 in FIG. 7). The threshold value TH_SOC is hereinafter referred to as a CD-to-CS switching threshold value TH_SOC.

Figure 2:
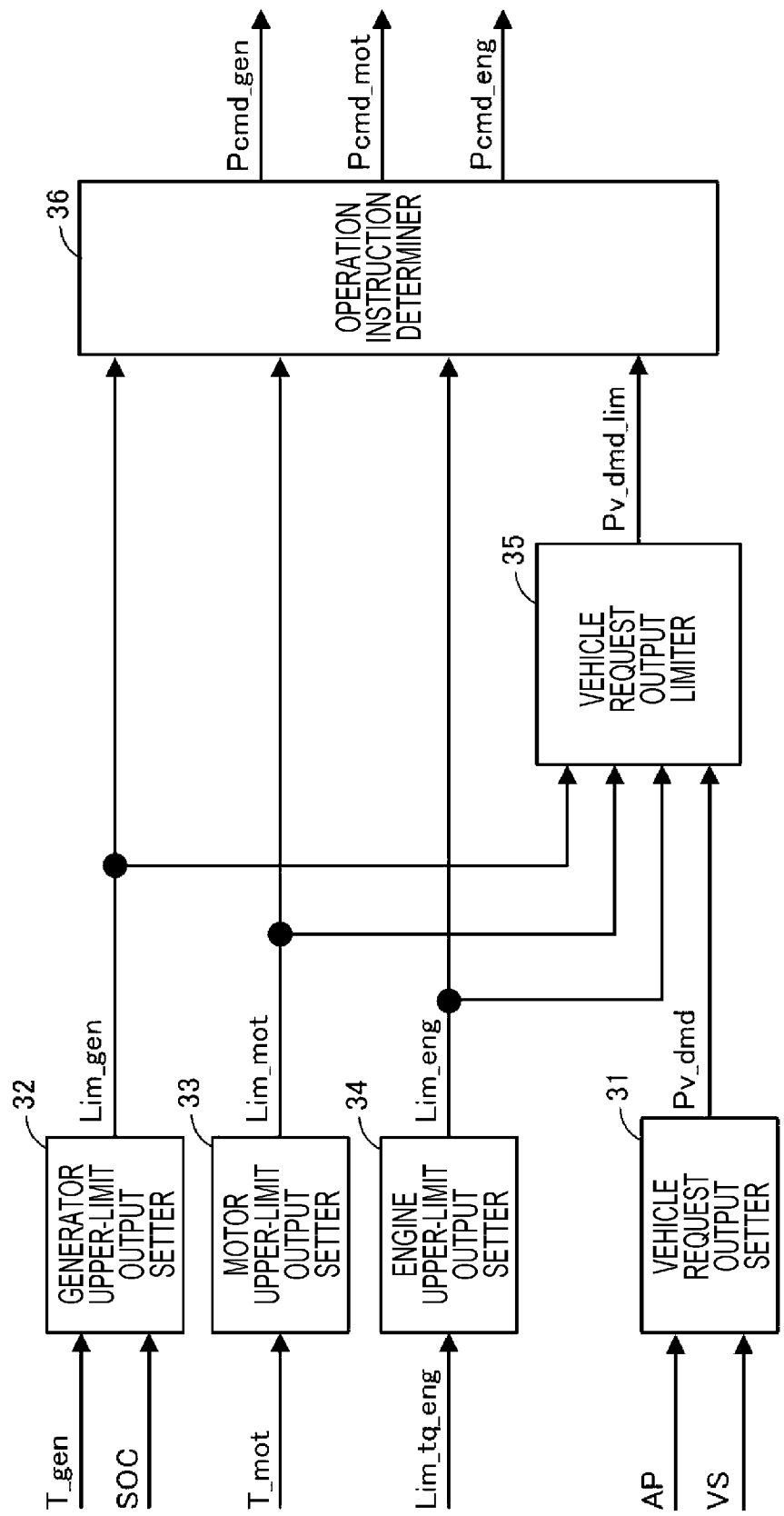
FIG. 2 is a block diagram illustrating an exemplary process in a control process illustrated in FIG. 1.

The control processes by the integrated control unit 8a in the control apparatus 8 in the CD mode will now be described with reference to a block diagram in FIG. 2. As illustrated in FIG. 2, the integrated control unit 8a in the control apparatus 8 includes a vehicle request output setter 31, a generator upper-limit output setter 32, a motor upper-limit output setter 33, an engine upper-limit output setter 34, a vehicle request output limiter 35, and an operation instruction determiner 36, as the functions to perform the control processes in the CD mode. The vehicle request output setter 31 sets a vehicle request output $Pv\_dmd$ indicating the motive energy (the required amount of energy per unit time) of the vehicle. The generator upper-limit output setter 32 sets a generator upper-limit output $Lim\_gen$, which is an upper limit output during the power running of the generator 4. The motor upper-limit output setter 33 sets a motor upper-limit output $Lim\_mot$, which is an upper limit output during the power running of the motor 3. The engine upper-limit output setter 34 sets an engine upper-limit output $Lim\_eng$, which is an upper limit output of the engine 2. The vehicle request output limiter 35 limits the upper limit of the vehicle request output $Pv\_dmd$. The operation instruction determiner 36 determines a target output $Pcmd\_eng$, a target output $Pcmd\_mot$, and a target output $Pcmd\_gen$, which are the operation instructions for the engine 2, the motor 3, and the generator 4, respectively.

The values of the above parameters: the vehicle request output $Pv\_dmd$, the generator upper-limit output $Lim\_gen$, the motor upper-limit output $Lim\_mot$, the engine upper-limit output $Lim\_eng$, the target output $Pcmd\_eng$, the target output $Pcmd\_mot$, and the target output $Pcmd\_gen$ are values in the units of electric power (in the units of energy amount per unit time) in the description of the present embodiment. More specifically, the target outputs $Pcmd\_eng$, $Pcmd\_mot$, and $Pcmd\_gen$ are target values charged on the engine 2, the motor 3, and the generator 4, respectively, in the total output necessary to drive the driving wheel DW.

The integrated control unit 8a sequentially performs the processes in the above functional units with a predetermined control process period. Specifically, the integrated control unit 8a performs the processes in the vehicle request output setter 31, the generator upper-limit output setter 32, the motor upper-limit output setter 33, and the engine upper-limit output setter 34 during each control process period.

The vehicle request output setter 31 sets the vehicle request output $Pv\_dmd$ from the detected values of the accelerator operation amount AP and the vehicle speed VS using a map, an operational expression, or the like that has been created in advance.

Figure 3:
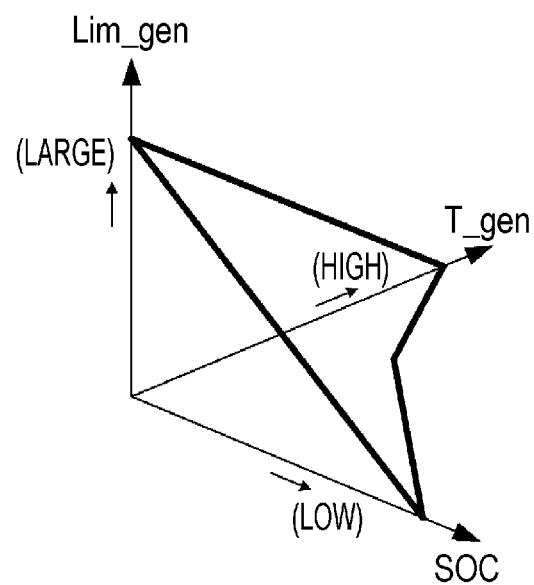
FIG. 3 is a graph illustrating an exemplary map used in a process in a generator upper-limit output setter illustrated in FIG. 2.
Figure 4:
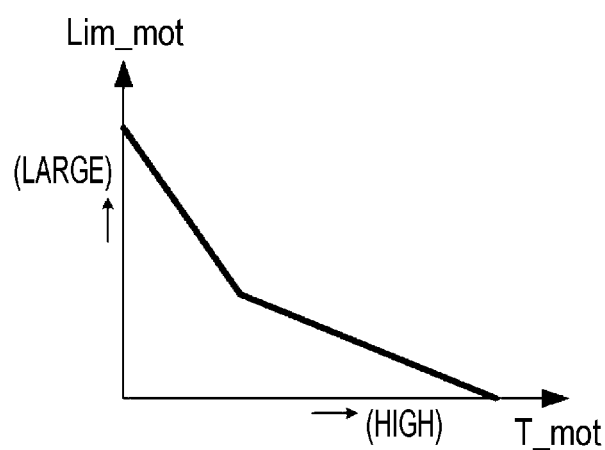
FIG. 4 is a graph illustrating an exemplary map used in a process in a motor upper-limit output setter illustrated in FIG. 2.

The generator upper-limit output setter 32 sets the generator upper-limit output $Lim\_gen$ from the detected values of the temperature $T\_gen$ of the generator 4 and the state of charge SOC using a map, such as the one illustrated in FIG. 3, which has been created in advance (or using an operational expression approximating the map).

In this case, the generator upper-limit output $Lim\_gen$ is basically set so as to be decreased with the increasing temperature $T\_gen$ of the generator 4 and to be decreased with the decreasing state of charge SOC.

However, in the present embodiment, when the value of the generator upper-limit output $Lim\_gen$ calculated using the map is smaller than or equal to a predetermined threshold value TH_gen, the generator upper-limit output $Lim\_gen$ is forcedly set to zero, as illustrated in FIG. 7.

The threshold value TH_gen is a threshold value that has been set in advance based on, for example, an experiment so as to continuously and rotationally drive the output shaft 2a of the engine 2 in the shutdown state against frictional resistance or the like in a state in which the output larger than or equal to the threshold value TH_gen is output from the generator 4.

The motor upper-limit output setter 33 sets the motor upper-limit output $Lim\_mot$ from the temperature $T\_mot$ of the motor 3 using a map, such as the one illustrated in FIG.

4, which been created in advance (or using an operational expression approximating the map). In this case, the motor upper-limit output Lim_mot is set so as to be decreased with the increasing temperature T_mot of the motor 3.

In the present embodiment, the motor upper-limit output Lim_mot in a temperature state in which the temperature T_mot of the motor 3 is equal to or is substantially equal to the temperature T_gen of the generator 4 is larger than the generator upper-limit output Lim_gen.

The engine upper-limit output setter 34 sets the engine upper-limit output Lim_eng by multiplying, for example, an upper-limit torque Lim_tq_eng (an upper limit value of output torque) of the engine 2, which has been set in advance, by a predetermined conversion factor. The upper-limit torque Lim_tq_eng is an upper-limit torque to operate the engine 2 in the third CD mode.

When the third CD mode is not used in the CD mode, the upper-limit torque Lim_tq_eng or the engine upper-limit output Lim_eng may be set to zero.

Next, the integrated control unit 8a performs the process in the vehicle request output limiter 35 using the vehicle request output Pv_dmd, the generator upper-limit output Lim_gen, the motor upper-limit output Lim_mot, and the engine upper-limit output Lim_eng, which are set in the above manner. If the vehicle request output Pv_dmd is smaller than or equal to a total upper-limit output, which is an upper-limit output of the sum of the generator upper-limit output Lim_gen, the motor upper-limit output Lim_mot, and the engine upper-limit output Lim_eng, the vehicle request output limiter 35 determines the vehicle request output Pv_dmd to be a limited vehicle request output Pv_dmd_lim.

If the vehicle request output Pv_dmd exceeds the total upper-limit output, the vehicle request output limiter 35 determines the total upper-limit output to be the limited vehicle request output Pv_dmd_lim. This limits the limited vehicle request output Pv_dmd_lim to a value smaller than or equal to the total upper-limit output.

The limited vehicle request output Pv_dmd_lim determined in the above manner is equal to the vehicle request output Pv_dmd in a state in which the vehicle request output Pv_dmd is smaller than or equal to the motor upper-limit output Lim_mot of the motor 3, which is the main power generation source in the CD mode (this state is generally the normal driving state of the vehicle).

Next, the integrated control unit 8a performs the process in the operation instruction determiner 36. If the limited vehicle request output Pv_dmd_lim is smaller than or equal to the motor upper-limit output Lim_mot, the operation instruction determiner 36 sets the operation mode of the power system 1 to the first CD mode. The operation instruction determiner 36 makes the target output Pcmd_mot of the motor 3 equal to the limited vehicle request output Pv_dmd_lim and sets the target output Pcmd_eng of the engine 2 and the target output Pcmd_gen of the generator 4 to zero.

If the limited vehicle request output Pv_dmd_lim exceeds the motor upper-limit output Lim_mot, the limited vehicle request output Pv_dmd_lim is not capable of being realized only with the output from the motor 3. In this case, the operation instruction determiner 36 determines whether the total value (=Pv_dmd_lim−Lim_mot+Pdrv_eng) of an excess (=Pv_dmd_lim−Lim_mot) and a charge amount Pdrv_eng necessary to rotationally drive the output shaft 2a of the engine 2 in the shutdown state with the power of the generator 4 is smaller than or equal to the generator upper-limit output Lim_gen.

The charge amount Pdrv_eng corresponds to the power (the lost power) that has been consumed for the rotational drive of the output shaft 2a of the engine 2 and that is not transmitted to the driving wheel DW, in the power of the generator 4, when the power running of the generator 4 is performed in the shutdown state of the engine 2. The charge amount Pdrv_eng is hereinafter referred to as a consumed output for driving of engine Pdrv_eng. The value of the consumed output for driving of engine Pdrv_eng is capable of being determined based on, for example, an experiment in advance. The consumed output for driving of engine Pdrv_eng may include a lost component other than the component necessary to rotationally drive the output shaft 2a of the engine 2.

In the above determination, if the total value (=Pv_dmd_lim−Lim_mot+Pdrv_eng) is smaller than or equal to the generator upper-limit output Lim_gen, the limited vehicle request output Pv_dmd_lim is capable of being realized with the powers of both the motor 3 and the generator 4.

In this case, the operation instruction determiner 36 sets the operation mode of the power system 1 to the second CD mode. The operation instruction determiner 36 makes the target output Pcmd_mot of the motor 3 equal to the motor upper-limit output Lim_mot, makes the target output Pcmd_gen of the generator 4 equal to the total value (=Pv_dmd_lim−Lim_mot+Pdrv_eng), and sets the target output Pcmd_eng of the engine 2 to zero.

If the total value (=Pv_dmd_lim−Lim_mot+Pdrv_eng) exceeds the generator upper-limit output Lim_gen, the limited vehicle request output Pv_dmd_lim is not capable of being realized even with the powers of both the motor 3 and the generator 4.

In this case, the operation instruction determiner 36 sets the operation mode of the power system 1 to the third CD mode. The operation instruction determiner 36 makes the target output Pcmd_mot of the motor 3 equal to the motor upper-limit output Lim_mot.

In addition, the operation instruction determiner 36 determines the target outputs Pcmd_eng and Pcmd_gen so that the total value (=Pcmd_eng+Pcmd_gen) of the target outputs Pcmd_eng and Pcmd_gen is equal to a remaining amount (=Pv_dmd_lim−Lim_mot) resulting from subtraction of the motor upper-limit output Lim_mot from the limited vehicle request output Pv_dmd_lim within a range in which the target output Pcmd_eng of the engine 2 and the target output Pcmd_gen of the generator 4 are not beyond the engine upper-limit output Lim_eng and the generator upper-limit output Lim_gen, respectively.

In this case, for example, a mode may be adopted in which the target output Pcmd_gen of the generator 4 is made equal to the generator upper-limit output Lim_gen and the target output Pcmd_eng of the engine 2 is made equal to a value (=Pv_dmd_lim−Lim_mot−Lim_gen) resulting from subtraction of the generator upper-limit output Lim_gen from the remaining amount (=Pv_dmd_lim−Lim_mot).

Alternatively, a mode may be adopted in which the target output Pcmd_eng of the engine 2 is made equal to the engine upper-limit output Lim_eng and the target output Pcmd_gen of the generator 4 is made equal to a value (=Pv_dmd_lim−Lim_mot−Lim_eng) resulting from subtraction of the engine upper-limit output Lim_eng from the remaining amount (=Pv_dmd_lim−Lim_mot).

Alternatively, the target output Pcmd_eng of the engine 2 and the target output Pcmd_gen of the generator 4 may be determined in consideration of, for example, the energy efficiency of the generator 4 or the engine 2.

Alternatively, the target output Pcmd_eng and the target output Pcmd_gen may be determined so that the target output Pcmd_gen of the generator 4 is smaller than or equal to the target output Pcmd_eng of the engine 2.

The integrated control unit 8a sequentially performs the processes to set the operation mode of the power system 1 to any of the first CD mode, the second CD mode, and the third CD mode and to determine the target outputs Pcmd_eng, Pcmd_mot, and Pcmd_gen of the engine 2, the motor 3, and the generator 4, respectively, in the CD mode in the above manner.

In this case, the operation mode is set to the first CD mode if the limited vehicle request output Pv_dmd_lim is smaller than or equal to the motor upper-limit output Lim_mot (the limited vehicle request output Pv_dmd_lim is capable of being realized only with the power of the motor 3) and the operation mode is set to the second CD mode or the third CD mode only if the limited vehicle request output Pv_dmd_lim exceeds the motor upper-limit output Lim_mot.

When the third CD mode, among the second CD mode and the third CD mode, is not used as the operation mode of the power system 1 in the CD mode, the operation mode of the power system 1 is set to the second CD mode if the limited vehicle request output Pv_dmd_lim exceeds the motor upper-limit output Lim_mot. In this case, the target output Pcmd_mot of the motor 3 and the target output Pcmd_gen of the generator 4 in the second CD mode are capable of being determined in the above manner. In other words, a mode may be adopted in which Pcmd_mot=Lim_mot and Pcmd_gen=Pv_dmd_lim−Lim_mot+Pdrv_eng.

When the second CD mode, among the second CD mode and the third CD mode, is not used as the operation mode of the power system 1 in the CD mode, the operation mode of the power system 1 is set to the third CD mode if the limited vehicle request output Pv_dmd_lim exceeds the motor upper-limit output Lim_mot. In this case, the target output Pcmd_mot of the motor 3, the target output Pcmd_eng of the engine 2, and the target output Pcmd_gen of the generator 4 in the third CD mode are capable of being determined in the above manner. In other words, a mode may be adopted in which Pcmd_mot=Lim_mot and Pcdm_eng+Pcmd_gen=Pv_dmd_lim Lim_mot (however, Pcmd_eng≤Lim_eng and Pcmd_gen≤Lim_gen).

In the second CD mode or the third CD mode, the target output Pcmd_mot of the motor 3 may be set to a value smaller than the motor upper-limit output Lim_mot. However, in the present embodiment, the target output Pcmd_mot of the motor 3 in the second CD mode or the third CD mode is made equal to the motor upper-limit output Lim_mot in the CD mode in order to increase the amount charged on the motor 3, which is the main power generation source, (the charge amount for the limited vehicle request output Pv_dmd_lim), as much as possible.

Figure 5:
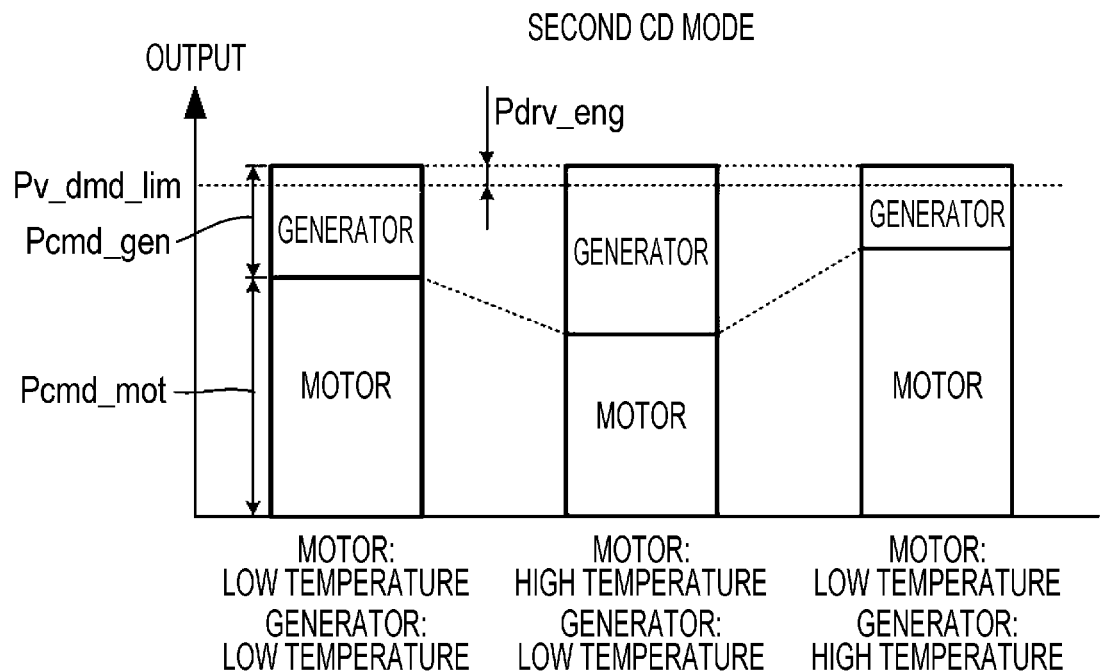
FIG. 5 illustrates an exemplary sharing pattern of powers of a motor and a generator in a second CD mode.

Determining the target output Pcmd_mot, the target output Pcmd_eng, and the target output Pcmd_gen in the CD mode in the above manner enables the target output Pcmd_mot of the motor 3 and the target output Pcmd_gen of the generator 4 to be determined, for example, based on charge sharing illustrated in FIG. 5 with respect to the limited vehicle request output Pv_dmd_lim when the operation mode of the power system 1 is set to the second CD mode.

Figure 6:
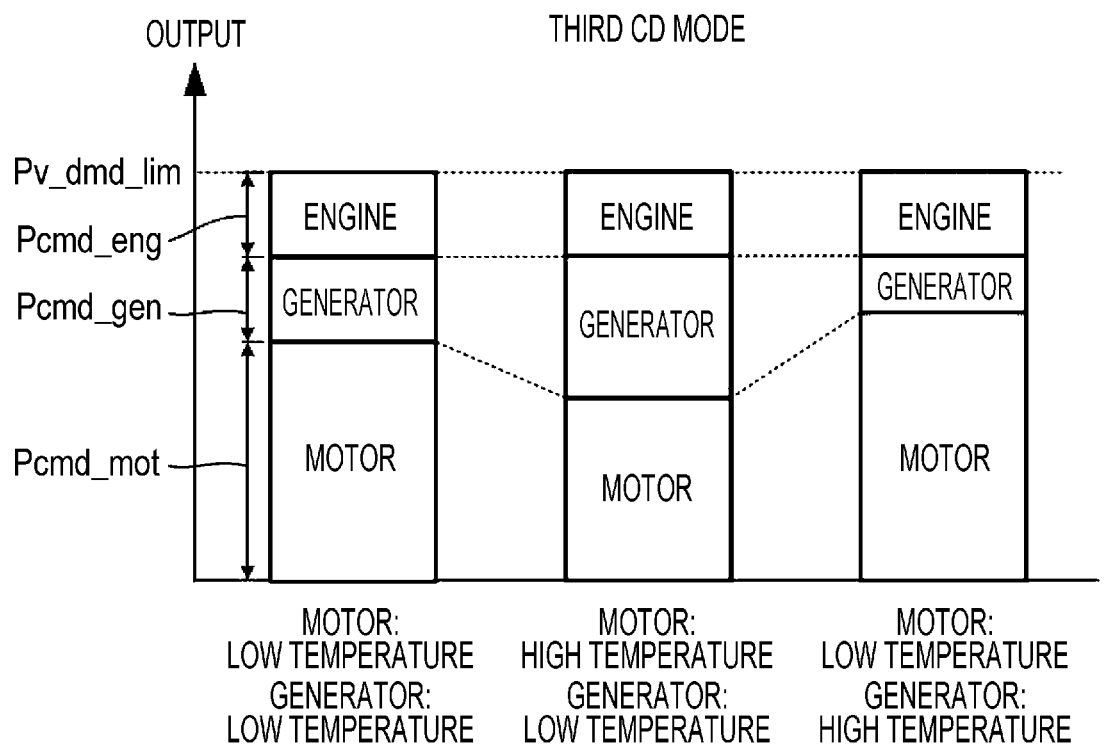
FIG. 6 illustrates an exemplary sharing pattern of powers of the motor, the generator, and an engine in a third CD mode.

The target output Pcmd_mot of the motor 3, the target output Pcmd_eng of the engine 2, and the target output Pcmd_gen of the generator 4 are capable of being determined, for example, based on charge sharing illustrated in FIG. 6 with respect to the limited vehicle request output Pv_dmd_lim when the operation mode of the power system 1 is set to the third CD mode.

As illustrated in FIG. 5 and FIG. 6, the target output Pcmd_mot of the motor 3 is decreased when the temperature T_mot of the motor 3 is high, compared with a case in which the temperature T_mot of the motor 3 is low. The target output Pcmd_gen of the generator 4 is decreased when the temperature T_gen of the generator 4 is high, compared with a case in which the temperature T_gen of the generator 4 is low.

In both the second CD mode and the third CD mode, the target output Pcmd_mot of the motor 3 is capable of being determined so that much of the limited vehicle request output Pv_dmd_lim is charged on the motor 3 otherwise the temperature T_mot of the motor 3 is high.

Although the target output Pcmd_gen of the generator 4 can be larger than the target output Pcmd_eng of the engine 2 in FIG. 6, the target output Pcmd_gen of the generator 4 may be limited to a value smaller than or equal to the target output Pcmd_eng of the engine 2.

The control apparatus 8 controls the operation of the power system 1 in the CD mode in accordance with the target outputs Pcmd_eng, Pcmd_mot, and Pcmd_gen determined in the above manner.

Specifically, in the first CD mode, the control apparatus 8 controls the inverter 21 and the voltage converter 23 in a state in which the engine 2 and the generator 4 are set to the shutdown state and the clutch 11 is set to the disconnection state to cause the electric power storage apparatus 6 to supply the electric power to the motor 3 so as to realize the target output Pcmd_mot (=Pv_dmd_lim) of the motor 3.

As a result, the driving wheel DW of the vehicle is driven with the power of the motor 3 so as to realize the limited vehicle request output Pv_dmd_lim. In this case, since the clutch 11 is in the disconnection state, the power of the motor 3 is not transmitted to the engine 2 side. Accordingly, it is possible to efficiently transmit the power from the motor 3 to the driving wheel DW. In addition, it is possible to efficiently use the power supplied from the electric power storage apparatus 6 to the motor 3 for the driving of the driving wheel DW.

Since the clutch 11 is in the disconnection state in the first CD mode, operating the engine 2 enables the power generating operation of the generator 4 to be performed with the power of the engine 2. The power generated in the generator 4 is capable of being supplied to the motor 3 during the power running of the motor 3 (during the driving of the driving wheel DW) or the electric power storage apparatus 6 is capable of being charged with the power generated in the generator 4, for example, when the vehicle is stopped.

Accordingly, in the present embodiment, the control apparatus 8 controls the operation of the engine 2 and the generator 4 so that the power generating operation of the generator 4 is performed under a certain condition, for example, in a situation in which the state of charge SOC (the detected value) in the electric power storage apparatus 6 is decreased to some extent (in a situation in which the state of charge SOC is decreased to a value close to the CD-to-CS switching threshold value TH_SOC) in the first CD mode.

In this case, the control apparatus 8 first controls the voltage converter 23 and the inverter 22 so that the electric power storage apparatus 6 supplies the electric power to the generator 4 to operate the generator 4 as a motor for starting the engine 2. Here, the amount of electric power to be supplied to the generator 4 is controlled so that the output shaft 2a of the engine 2 is rotationally driven at a predetermined starting rotation speed with the power of the generator 4.

The control apparatus 8 controls the fuel supply apparatus, the throttle valve, the actuator, and so on in the engine 2 in the state in which the output shaft 2a of the engine 2 is rotationally driven (in the cranking state of the engine 2) to start the operation of the engine 2.

After the engine 2 is started, the control apparatus 8 controls the inverter 22 and the voltage converter 23 while controlling the output from the engine 2 so as to cause the generator 4 to output desired generated electric power.

The engine 2 and the generator 4 may be kept at the shutdown state not to perform the power generating operation of the generator 4 in the first CD mode.

In the second CD mode, the control apparatus 8 controls the inverters 21 and 22 and the voltage converter 23 in a state in which the engine 2 is set to the shutdown state and the clutch 11 is set to the connection state to cause the electric power storage apparatus 6 to supply the electric power to the motor 3 and the generator 4 so as to realize the target output Pcmd_mot of the motor 3 and the target output Pcmd_gen of the generator 4.

As a result, the driving wheel DW of the vehicle is driven with the powers of both the motor 3 and the generator 4 so as to realize the limited vehicle request output Pv_dmd_lim.

In this case, the control apparatus 8 keeps an intake valve and an exhaust valve (not illustrated) of each cylinder of the engine 2 at a closed state to set the each cylinder of the engine 2 in an idle state in the present embodiment. This prevents an occurrence of pumping loss of the engine 2. Accordingly, it is possible to reduce as much as possible the lost power, in the output from the generator 4, which is consumed for rotational driving of the output shaft 2a of the engine 2.

Consequently, the powers of both the motor 3 and the generator 4 are capable of being efficiently transmitted to the driving wheel DW. In addition, the power supplied from the electric power storage apparatus 6 to the motor 3 and the generator 4 is capable of being efficiently used for driving of the driving wheel DW.

The driving wheel DW is driven with large driving force without generating the exhaust of the engine 2 by driving the driving wheel DW with the powers of both the motor 3 and the generator 4 while the engine 2 is being kept at the shutdown state in the second CD mode.

In the third CD mode, the control apparatus 8 sets the clutch 11 to the connection state after the engine 2 is started in the same manner as in the case in which the power generating operation of the generator 4 is performed in the first CD mode and controls the operation of the engine 2 so as to realize the target output Pcmd_eng of the engine 2. In addition, the control apparatus 8 controls the inverters 21 and 22 and the voltage converter 23 to cause the electric power storage apparatus 6 to supply the electric power to the motor 3 and the generator 4 so as to realize the target output Pcmd_mot of the motor 3 and the target output Pcmd_gen of the generator 4.

As a result, the driving wheel DW of the vehicle is driven with the powers of the three power generation sources: the engine 2, the motor 3 and the generator 4 so as to realize the limited vehicle request output Pv_dmd_lim.

The driving wheel DW is driven with larger driving force, compared with that in the second CD mode, by driving the driving wheel DW with the powers of the three power generation sources: the engine 2, the motor 3 and the generator 4 in the third CD mode.

In the CD mode of the present embodiment, the motor upper-limit output Lim_mot and the generator upper-limit output Lim_gen are variably set in accordance with the temperature T_mot of the motor 3 and the temperature T_gen of the generator 4, respectively, as described above. Accordingly, when the temperature T_mot of the motor 3 is high in the second CD mode or the third CD mode in which the power running of both the motor 3 and the generator 4 is performed, the power charged on the motor 3 (=Pcmd_mot), in the limited vehicle request output Pv_dmd_lim, is decreased, compared with the case in which the temperature T_mot of the motor 3 is low.

When the temperature T_gen of the generator 4 is high, the power charged on the generator 4 (=Pcmd_gen), in the limited vehicle request output Pv_dmd_lim, is decreased, compared with the case in which the temperature T_gen of the generator 4 is low.

As a result, the charge amounts on both the motor 3 and the generator 4 are capable of being adjusted so as to prevent the temperatures of the motor 3 and the generator 4 from being excessively increased.

The generator upper-limit output Lim_gen is variably set in accordance with the state of charge SOC in the electric power storage apparatus 6, as described above. Accordingly, the generator upper-limit output Lim_gen is decreased with the decreasing state of charge SOC, for example, as illustrated in FIG. 7. When the state of charge SOC is decreased to a small amount, the output from the generator 4 is limited to a small amount, thus suppressing an increase in temperature of the generator 4.

Consequently, even in the first CD mode after the power system 1 is operated in the second CD mode, the power generating operation of the generator 4 is capable of being performed in a state in which the temperature T_gen of the generator 4 is not increased so much. The power generating operation enables sufficient power to be generated. Referring to FIG. 7, a period ΔT1 and a period ΔT2 indicate the periods in which the power generating operation of the generator 4 is performed. In this case, the state of charge SOC in the electric power storage apparatus 6 is increased when the vehicle is stopped.

The control processes by the control apparatus 8 in the CS mode will now be described. In the CS mode, the control apparatus 8 constantly keeps the engine 2 at an operating state and sets the clutch 11 to the connection state during the driving of the vehicle. In addition, the control apparatus 8 sets the vehicle request output Pv_dmd in the same manner as in the CD mode. The control apparatus 8 basically controls the output from the engine 2 so as to realize the vehicle request output Pv_dmd with the power of the engine 2.

However, in a situation in which the vehicle request output Pv_dmd exceeds a certain value, the control apparatus 8 controls the operation of the engine 2 and the motor 3 so that part of the vehicle request output Pv_dmd is charged on the motor 3 (so that the parallel hybrid drive of the vehicle is performed). The power running of the generator 4 is not performed in the CS mode.

The control apparatus 8 controls the engine 2, the inverter 22, and the voltage converter 23 so as to appropriately perform the power generating operation of the generator 4 in order to suppress further reduction in the state of charge SOC in the electric power storage apparatus 6 to charge the electric power storage apparatus 6 with the power generated in the generator 4.

For example, the series hybrid drive of the vehicle may be performed in the CS mode. In this case, for example, the generated power is supplied to the motor 3 so that the vehicle request output Pv_dmd is realized with the power of the motor 3 while the power generating operation of the generator 4 is being performed so as to support the power for the power running of the motor 3 with the power generated in the generator 4.

Although one embodiment of the present disclosure has been described, the present disclosure is not limited to the above embodiment.

For example, although the case is described in the above embodiment in which the power system 1 is mounted in the vehicle (the hybrid vehicle), the power system 1 may be used in a transportation machine other than the vehicle, such as a ship or a rail vehicle. In addition, the power system 1 is not limitedly applied to the transportation machine and may be applied to a stationary apparatus.

The present application describes a power system including an internal combustion engine; a motor, a generator, a power transmission mechanism, and a control apparatus. The motor is capable of performing power running. The generator is capable of performing power generating operation and the power running. Output shafts of the internal combustion engine, the motor, and the generator are connected to the power transmission mechanism. The power transmission mechanism is capable of transmitting powers of three power generation sources including the internal combustion engine, the motor, and the generator to a driven load regardless of whether power is generated by another power generation source and is capable of performing power transmission between the internal combustion engine and the generator. The control apparatus controls operations of the internal combustion engine, the motor, and the generator. The control apparatus has functions to perform a first control process to cause the motor to perform the power running so that only the power of the motor is transmitted to the driven load and to perform a second control process to cause both the motor and the generator to perform the power running so that the powers of both the motor and the generator are transmitted to the driven load.

With the above power system, the control apparatus has the function to perform the second control process, in addition to the function to perform the first control process. In the second control process, the power running of both the motor and the generator is performed so that the powers of both the motor and the generator are transmitted to the driven load.

Accordingly, the power of the generator is used, in addition to the power of the motor, for driving of the driven load. Consequently, the driven load is driven with large power in which the power of the motor and the power of the generator are combined.

The power transmission mechanism is capable of transmitting the powers of the three power generation source: the internal combustion engine, the motor, and the generator to the driven load regardless of whether power is generated by another power generation source. Accordingly, the powers of the respective power generation sources are transmitted to the driven load without being restricted by the power of another power generation source.

Consequently, with the above power system, it is possible to transmit sufficient power to the driven load while reducing an occurrence of a situation in which the power of the internal combustion engine is required for driving of the driven load and to transmit the powers of the internal combustion engine, the motor, and the generator to the driven load across a wide range.

In the above power system, the power transmission mechanism may be configured so that the output shaft of the internal combustion engine and the output shaft of the generator rotate in conjunction with each other. In this case, it is preferred that the control apparatus be capable of performing the second control process in a shutdown state of the internal combustion engine and keep at least part of cylinders of the internal combustion engine at an idle state in the second control process when the internal combustion engine is in the shutdown state.

The "idle state" of each cylinder in the internal combustion engine means a state in which an intake valve and an exhaust valve of the cylinder is kept at a closed state.

With the above power system, at least part of the cylinders of the internal combustion engine is kept at the idle state although part of the power of the generator is consumed for rotational driving of the output shaft of the internal combustion engine in the shutdown state when the second control process is performed in the shutdown state of the internal combustion engine. Accordingly, pumping loss of the internal combustion engine is reduced.

Accordingly, the power consumed for the rotational driving of the output shaft of the internal combustion engine, in the power of the generator, is decreased. In addition, the power capable of being transmitted from the generator to the driven load is increased as much as possible.

In the above power system, when the power transmission mechanism is configured so that the output shaft of the internal combustion engine and the output shaft of the generator rotate in conjunction with each other or when the control apparatus is capable of performing the second control process in the shutdown state of the internal combustion engine, the control apparatus preferably causes the generator to output power higher than or equal to the power that is consumed for rotational driving of the output shaft of the internal combustion engine in the second control process when the internal combustion engine is in the shutdown state.

With the above power system, performing the second control process enables the power of the generator to be transmitted to the driven load without wastefully consuming the power to be supplied to the generator.

In the above power system, the control apparatus may be capable of performing the second control process in an operating state of the internal combustion engine. In this case, the control apparatus preferably causes the internal combustion engine to operate so that the power of the internal combustion engine is transmitted to the driven load along with the powers of both the motor and the generator in the second control process when the internal combustion engine is in the operating state.

With the above power system, it is also possible to transmit the powers of all of the internal combustion engine, the motor, and the generator to the driven load. In addition, it is possible to transmit larger power to the driven load.

In the above power system, the control apparatus may cause the internal combustion engine and the generator to operate so that the power to be transmitted from the internal combustion engine to the driven load is higher than the power to be transmitted from the generator to the driven load in the second control process when the internal combustion engine is in the operating state.

In the above power system, the internal combustion engine may be capable of outputting the power higher than that of the generator.

In the above power system, the control apparatus may cause the motor and the generator to operate so that the power to be transmitted from the motor to the driven load is higher than the power to be transmitted from the generator to the driven load in the second control process.

In the above power system, the motor may be capable of outputting the power higher than that of the generator.

With the above power system, it is possible to prevent the generator from being increased in size.

In the above power system, it is preferred that the control apparatus be capable of acquiring detection data indicating a temperature of at least one of the motor and the generator and variably adjusting the power of at least one of the motor and the generator in accordance with the temperature in the second control process.

With the above power system, it is possible to variably adjust the power of at least one of the motor and the generator with the temperature state of at least one of the motor and the generator being reflected in the first control process. Accordingly, for example, it is possible to perform the power running of both the motor and the generator so as to prevent the temperatures of the motor or the generator from being excessively increased.

In the above power system, the detection data may include detection data indicating the temperature of the motor. In this case, the control apparatus preferably decreases the ratio of the power of the motor to a total power of the motor and the generator with the increasing temperature of the motor in the second control process.

With the above power system, it is possible to reduce the charge amount on the motor in the total power of the motor and the generator to suppress further increase in temperature of the motor when the temperature of the motor is high.

In the above power system, the detection data may include detection data indicating the temperature of the generator. In this case, the control apparatus preferably decreases the ratio of the power of the generator to the total power of the motor and the generator with the increasing temperature of the generator in the second control process.

With the above power system, it is possible to reduce the charge amount on the generator in the total power of the motor and the generator to suppress further increase in temperature of the generator when the temperature of the generator is high.

In the above power system, the control apparatus may be capable of variably adjusting the power of the generator in accordance with a state of charge in an electric power storage apparatus that supplies and receives power to and from the generator in the second control process.

With the above power system, it is possible to adjust the power of the generator with the state of charge in the electric power storage apparatus that supplies and receives power to and from the generator being reflected in the second control process.

In the above power system, the control apparatus preferably decreases an upper-limit value of the power of the generator with the decreasing state of charge in the electric power storage apparatus in the second control process.

With the above power system, the power of the generator is suppressed to a smaller amount and the temperature of the generator is prevented from being excessively increased when the state of charge in the electric power storage apparatus is low in the second control process. Accordingly, for example, when the power-generating operation of the generator (the power-generating operation with the power of the internal combustion engine) is performed after the second control process is completed in order to supplement the power supply from the electric power storage apparatus to the motor or in order to charge the electric power storage apparatus, it is possible to perform the power-generating operation of the generator in a state in which the temperature of the generator is relatively low. In addition, it is possible to perform the power-generating operation of the generator with sufficient generated power in the power-generating operation.

In the above power system, the control apparatus may adopt a charge depleting (CD) mode and a charge sustaining (CS) mode as modes of the control process. The power system is caused to operate so as to consume storage power in the electric power storage apparatus that stores power for the power running of the motor and the generator in the CD mode and the power system is caused to operate so as to suppress reduction in the storage power in the electric power storage apparatus in the CS mode. In this case, the second control process is preferably performed only in the CD mode.

With the above power system, large power is transmitted to the driven load without using the power of the internal combustion engine in the CD mode while consumption of the power in the electric power storage apparatus through the power running of the generator is avoided in the CS mode. Accordingly, it is possible to appropriately prevent reduction in the state of charge in the electric power storage apparatus in the CS mode.

In the above power system, the control apparatus preferably performs the second control process under a condition in which a required output for driving the driven load is larger than or equal to a predetermined value.

With the above power system, the second control process in which the power running of both the motor and the generator is performed is performed only in a situation in which the need for the power running is high. In addition, it is possible to suppress increase in power loss due to the power running of both the motor and the generator and to reduce the charge on the generator.

The present application describes a transportation machine including the above power system.

With the above transportation machine, it is possible to provide the transportation machine capable of achieving the advantages described above.

The present application describes a method for operating a power system including an internal combustion engine; a motor capable of performing power running; a generator capable of performing power generating operation and the power running; and a power transmission mechanism to which output shafts of the internal combustion engine, the motor, and the generator are connected, which is capable of transmitting powers of three power generation sources including the internal combustion engine, the motor, and the generator to a driven load regardless of whether power is generated by another power generation source, and which is capable of performing power transmission between the internal combustion engine and the generator. The method includes a first step of causing the motor to perform the power running so that only the power of the motor is transmitted to the driven load and a second step of causing both the motor and the generator to perform the power running so that the powers of both the motor and the generator are transmitted to the driven load.

With the above method of operating the power system, it is possible to achieve the same advantages as those of the power system described above.

Obviously, numerous modifications and variations of the present invention are possible in light of the above teachings. It is therefore to be understood that within the scope of the appended claims, the invention may be practiced otherwise than as specifically described herein.

What is claimed is:

1. A power system comprising:
an internal combustion engine;
a motor to perform power running;
a generator to perform power generating operation and the power running;
a power transmission mechanism via which the internal combustion engine, the motor, and the generator are connected to drive a driven load by at least one of the internal combustion engine, the motor, and the generator and to perform power transmission between the internal combustion engine and the generator; and
a processor configured to perform a first control process to control the motor to perform the power running so that the driven load is driven only by the motor and to perform a second control process to control both the motor and the generator to perform the power running so that the driven load is driven by both of the motor and the generator,
wherein the processor is to acquire detection data indicating a temperature of at least one of the motor and the generator and variably adjusting a power of at least one of the motor and the generator in accordance with the temperature in the second control process.

2. The power system according to claim 1,
wherein the power transmission mechanism is configured so that an output shaft of the internal combustion engine and an output shaft of the generator rotate in conjunction with each other, and
wherein the processor is to perform the second control process in a shutdown state of the internal combustion engine and keeps at least part of cylinders of the internal combustion engine at an idle state in the second control process when the internal combustion engine is in the shutdown state.

3. The power system according to claim 1,
wherein the power transmission mechanism is configured so that an output shaft of the internal combustion engine and an output shaft of the generator rotate in conjunction with each other, and
wherein the processor is to perform the second control process in a shutdown state of the internal combustion engine and controls the generator to output power higher than or equal to power that is consumed for rotational driving of the output shaft of the internal combustion engine in the second control process when the internal combustion engine is in the shutdown state.

4. The power system according to claim 1,
wherein the processor is to perform the second control process in an operating state of the internal combustion engine and controls the internal combustion engine to operate so that a power of the internal combustion engine is transmitted to the driven load along with powers of both the motor and the generator in the second control process when the internal combustion engine is in the operating state.

5. The power system according to claim 4,
wherein the processor controls the internal combustion engine and the generator to operate so that the power to be transmitted from the internal combustion engine to the driven load is higher than the power to be transmitted from the generator to the driven load in the second control process when the internal combustion engine is in the operating state.

6. The power system according to claim 4,
wherein the internal combustion engine is to output the power higher than that of the generator.

7. The power system according to claim 1,
wherein the processor controls the motor and the generator to operate so that a power to be transmitted from the motor to the driven load is higher than a power to be transmitted from the generator to the driven load in the second control process.

8. The power system according to claim 1,
wherein the motor is to output a power higher than that of the generator.

9. The power system according to claim 1,
wherein the detection data includes detection data indicating the temperature of the motor, and
wherein the processor decreases a ratio of the power of the motor to a total power of the motor and the generator with the increasing temperature of the motor in the second control process.

10. The power system according to claim 1,
wherein the detection data includes detection data indicating the temperature of the generator, and
wherein the processor decreases a ratio of the power of the generator to a total power of the motor and the generator with the increasing temperature of the generator in the second control process.

11. A power system comprising:
an internal combustion engine;
a motor to perform power running;
a generator to perform power generating operation and the power running;
a power transmission mechanism via which the internal combustion engine, the motor, and the generator are connected to drive a driven load by at least one of the internal combustion engine, the motor, and the generator and to perform power transmission between the internal combustion engine and the generator; and
a processor configured to perform a first control process to control the motor to perform the power running so that the driven load is driven only by the motor and to perform a second control process to control both the motor and the generator to perform the power running so that the driven load is driven by both of the motor and the generator,
wherein the processor is to variably adjust a power of the generator in accordance with a state of charge in an electric power storage apparatus that supplies and receives power to and from the generator in the second control process.

12. The power system according to claim 11,
wherein the processor decreases an upper-limit value of the power of the generator with a decreasing state of charge in the electric power storage apparatus in the second control process.

13. A power system comprising:
an internal combustion engine;
a motor to perform power running;
a generator to perform power generating operation and the power running;
a power transmission mechanism via which the internal combustion engine, the motor, and the generator are connected to drive a driven load by at least one of the internal combustion engine, the motor, and the generator and to perform power transmission between the internal combustion engine and the generator; and
a processor configured to perform a first control process to control the motor to perform the power running so that the driven load is driven only by the motor and to perform a second control process to control both the motor and the generator to perform the power running so that the driven load is driven by both of the motor and the generator, wherein the processor has a charge depleting mode and a charge sustaining mode and performs the second control process only in the charge depleting mode, and wherein the power system is controlled to operate so as to consume storage power in an electric power storage apparatus that stores power for the power running of the motor and the generator in the charge depleting mode and the power system is controlled to operate so as to suppress reduction in the storage power in the electric power storage apparatus in the charge sustaining mode.

14. The power system according to claim 1, wherein the processor performs the second control process under a condition in which a required output for driving the driven load is larger than or equal to a predetermined value.

\* \* \* \* \*